March 26, 1968

E. L. YOUNG 3,375,385

ROTOR MEANS CONNECTION

Filed Feb. 4, 1965

INVENTOR.
ELMER L. YOUNG
BY
Albert H. Reuther
HIS ATTORNEY

INVENTOR.
ELMER L. YOUNG

March 26, 1968     E. L. YOUNG     3,375,385
ROTOR MEANS CONNECTION
Filed Feb. 4, 1965     3 Sheets-Sheet 3

INVENTOR.
ELMER L. YOUNG
BY
Albert H. Reutter
HIS ATTORNEY

United States Patent Office 3,375,385
Patented Mar. 26, 1968

3,375,385
ROTOR MEANS CONNECTION
Elmer L. Young, Englewood, Ohio, assignor to General Motors Corporation, Detroit, Mich., a corporation of Delaware
Filed Feb. 4, 1965, Ser. No. 430,368
7 Claims. (Cl. 310—261)

This invention relates to dynamoelectric machine rotor means, and, more particularly, to connections for electrical conductors in squirrel cage induction motors.

A need exists for savings in materials and elimination of components through retaining functions thereof and gaining additional uses from a minimum number of parts. Accordingly, an object of the present invention is to provide new and improved rotor means with laminations at opposite ends thereof being of dual purpose material both to retain magnetic characteristics and having a solderable coating of electrically conductive material in at least predetermined regions thereof for juncture directly with electrical conductors extending axially through the laminations in conductor slots.

Another object of the present invention is to provide rotor means structurally including a stack of laminations in combination including identically punched magnetic laminations per se, an insulating lamination adjacent to each of opposite axial ends, and combination end ring and end lamination means of conductively coated magnetic material having a dual purpose for material savings due to fusion thereof into electrical shorting connection directly to opposite ends of electrical conductors extending axially through only all of the laminations as simulated-fan-blade heat dissipators.

Another object of the present invention is to provide rotor means structurally including a stack of laminations in combination including identically punched magnetic laminations per se, an insulating lamination of high temperature phenolic material adjacent to each of opposite axial ends, and combination end ring and end lamination means of conductively solder-coated magnetic material having a dual purpose for material savings due to fusion thereof into electrical shorting connection directly to opposite ends of electrical conductors extending axially through only all of the laminations as simulated-fan-blade heat dissipators subject to slight taper of outer diameter of combination end ring and end lamination means in a zone of soldering upon outer diameter rotor finishing.

Another object of the present invention is to provide end connections for amortisseur windings of alternator poles by shorting laminations per se at ends thereof for less increase in stray losses subject to connections pole to pole made near centrally located shaft means away from space needed for winding means.

Further objects and advantages of the present invention will be apparent from the following description, reference being had to the accompanying drawings wherein preferred embodiments of the present invention are clearly shown.

A considerable number of parts can be necessary for formation of a shorted or squirrel cage winding means on a rotor of a dynamoelectric machine. Reference can be made to disclosure of Patent 3,137,800, Young, issued June 16, 1964, and belonging to the assignee of the present invention as representative of one type of squirrel cage rotor winding arrangement and interconnection by end ring means as previously known. Also reference can be made to copending applications Ser. No. 282,335, Partlow et al., and Ser. No. 282,416, Herzog et al., both filed May 22, 1963, and belonging to the assignee of the present invention for cast metal squirrel cage winding arrangements. Such cast metal squirrel cage winding arrangements usually include an integrally cast end ring means extending annularly on opposite sides of the rotor means. Such casting operations require additional metal such as aluminum to be used in relatively heavy quantities axially on opposite sides of the rotor means.

Figure 1:
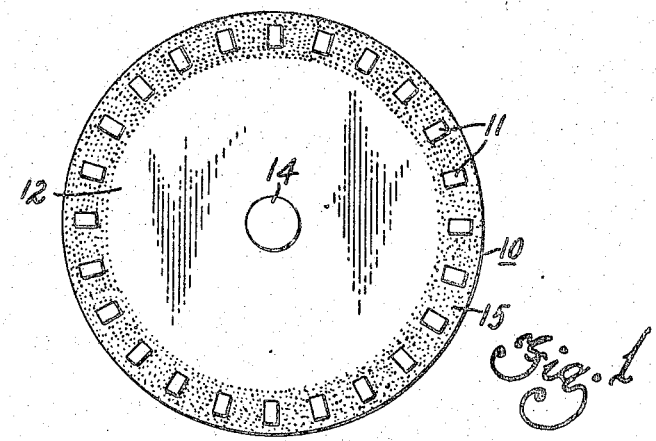
FIGURE 1 is an end view of rotor means having features in accordance with the present invention.

A rotor means generally indicated by numeral 10 in FIGURE 1 of the drawings includes a plurality of rotor conductors 11 or bars of metal fitted through slots of laminations 12 carried by a shaft 14. Further details of the rotor means 10 can be seen in FIGURE 2 of the drawings, and it is noted that the laminations 12 are all substantially identical to each other subject to at least a pair of the end laminations on each end having a dual purpose material. Such a pair of end laminations on each end would be made of steel with a coating of solderable, electrically conductive material 15 thereon at least radially for a distance substantially coinciding with radial distance of the rotor conductors 11. After stacking of the laminations 12 including at least pairs of end laminations having the coating 15 of solderable electrically conductive material thereon, localized heat is applied to effect soldering together of the end laminations per se and to the rotor conductors in combination directly therewith to form end connections without need for any additional end ring structures as previously known. Since the end laminations are also steel, the end laminations become part of the magnetic circuit together with the electrically conductive end connections established by the same laminations having the coating 15 thereon. It is to be understood that the soldering can be done by dipping, furnace heating and otherwise.

Specific regions of soldering 16 are provided axially adjacent to opposite ends of the rotor means 10. As an aid in supplying additional solder for the spaces between the laminations and the rotor conductors, it is possible also for one lamination at least on each end to be made specifically from a sheet of solder stamped by or punched by the same dies as used to punch the magnetic laminations.

Figure 2:
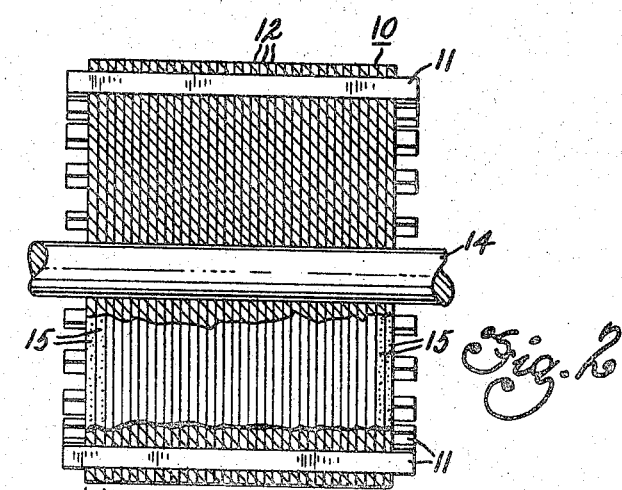
FIGURE 2 is a cross-sectional elevational view of one embodiment of rotor means having features in accordance with the present invention.
Figure 3:
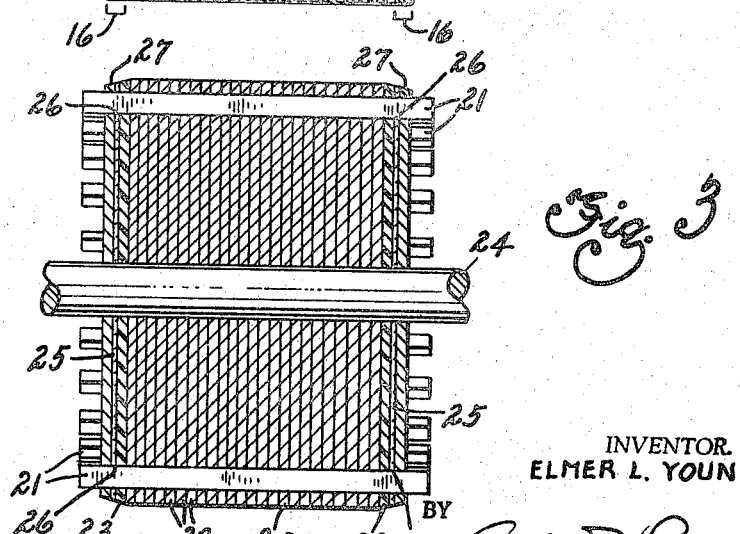
FIGURE 3 is another cross-sectional view of rotor means to show further features in accordance with the present invention.

Referring to FIGURE 3 of the drawings, it is noted that another rotor means generally indicated by numeral 20 is shown including magnetic laminations as well as rotor conductors 21 which can have a steel core and a copper plating thereon subject to free ends thereof being exposed as simulated fan blades in a manner similar to the exposure of such free ends of the rotor conductors 11 of FIGURES 1–2. Magnetic material laminations 22 are provided centrally for the core of the rotor means 20 and a phenolic or high temperature insulating material disc 23 can all be carried on a shaft 24. Also press fitted onto the shaft 24 can be a pair of end laminations having a lamination of solder material 25 added therebetween. This disc or lamination of solder designated by reference numeral 25 upon heating adheres to the laminations on opposite sides thereof and simultaneously is shielded by each end lamination at a juncture 26 with each of the rotor conductors or bars. The soldered junctures obtained by fusion of the soldering materials 15 and 25 results in a high resistance end ring connection in effect without the physical presence of any end ring which is eliminated though function thereof is retained. The disc or lamination of insulating material designated by reference numeral 23 in FIGURE 3 can also be punched with the same dies as used to punch the rotor laminations and soldering discs. In the embodiment of FIGURE 3 each of the opposite ends is provided with an inwardly tapered edging 27 provided during finishing of the outer periphery of the laminated rotor means 20.

Possible detrimental effects of connecting laminations together, permitting stray losses and currents across laminations, can be limited to short sections axially at each end of the rotor means by provision of the insulating material disc 23. Stack length for the rotor lamination assembly can be longer than axial distance of a stator lamination stack having windings carried thereby in a usual manner though not shown in the drawings for the present invention. Also it is to be noted that for greater end connection conductivity, the end pair of laminations could be made of copper metal rather than steel for fusion by soldering beyond the magnetic portion. The tapering 27 along the outer diameter of the rotor means 20 is particularly advantageous where loads are encountered giving periodic high rotor currents. The pair of end laminations can be made good electrical conductors by copper or tin plating or by tin plate over copper plate. If assembled with fluxed and tinned end laminations, the end connection electrically can be made by furnace heating at the soldering temperature. The advantages of the rotor means 10 and 20 illustrated by views of FIGURES 1–3 inclusive include the making of a squirrel cage rotor winding without separate tools for end connecting materials. Certain rotor laminations and materials are used for dual purposes thereby resulting in a materials savings. Also the rotor conductors can be used as fan blades or heat dissipators with a wide range of the number of conductors left projecting from opposite ends of a predetermined number of laminations stacked axially in alignment as to each other. It is to be understood that the rotor conductors or bars can be terminated flush with each end lamination also if desired. The rotor structures described can be readily brazed into assembled relationship in a heated furnace.

Figure 4:
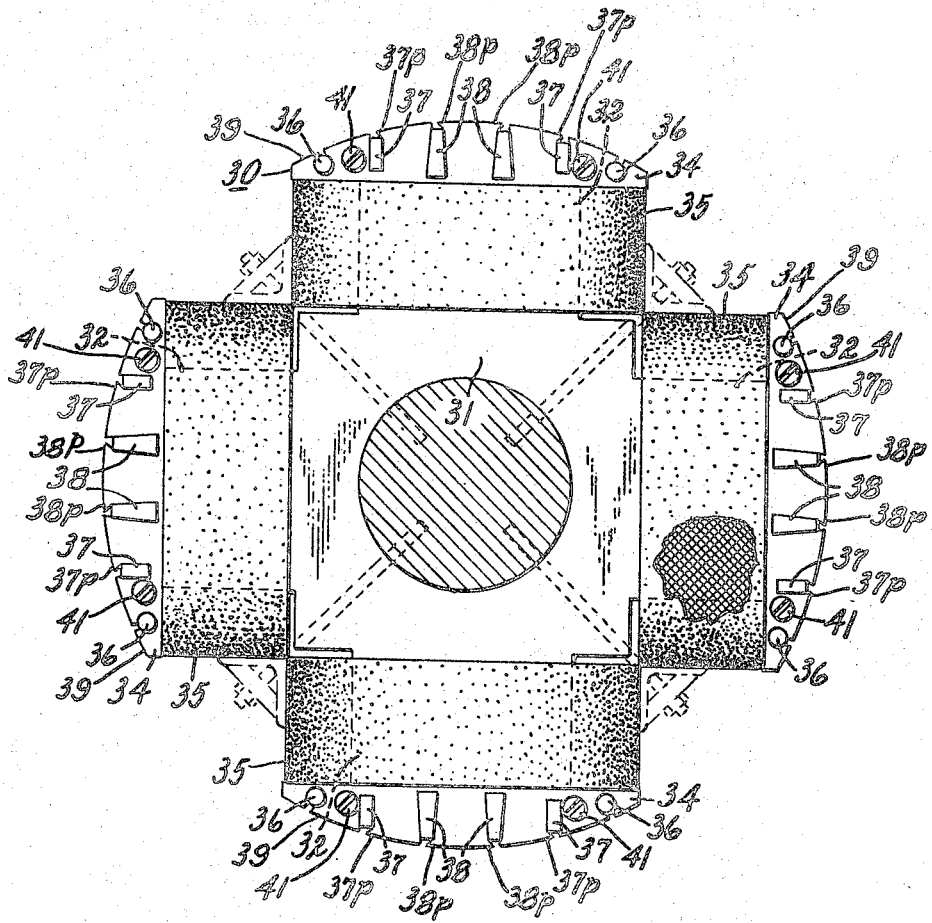
FIGURE 4 is an end view of rotor means structure to show features of the present invention for use with amortissuer winding means.

Features of the present invention are also advantageous for rotor means having amortisseur windings with alternator poles. In FIGURE 4 there is shown a rotor means generally indicated by numeral 30 including laminations 31 adapted to be carried on a shaft in a well known manner and providing reduced width portions 32 of laminations as well as enlarged ends or head portions 34 of the same laminations. The reduced width portion 32 for each pole provides a mounting location for wound coil portions 35 in a well known manner. Previously considerable structure has been required for interconnection of amortisseur conductor bars designated by reference numerals 36, 37 and 38 for round, rectangular and truncated cross-sectional configurations respectively. It is to be noted that each head portion 34 of the poles defined by each lamination has a substantially rounded outer peripheral edging 39. An example of previous interconnection of amortisseur windings can be found in a copending application Ser. No. 306,818, Tyler, filed Sept. 5, 1963, and belonging to the assignee of the present invention.

Figures 5, 6:
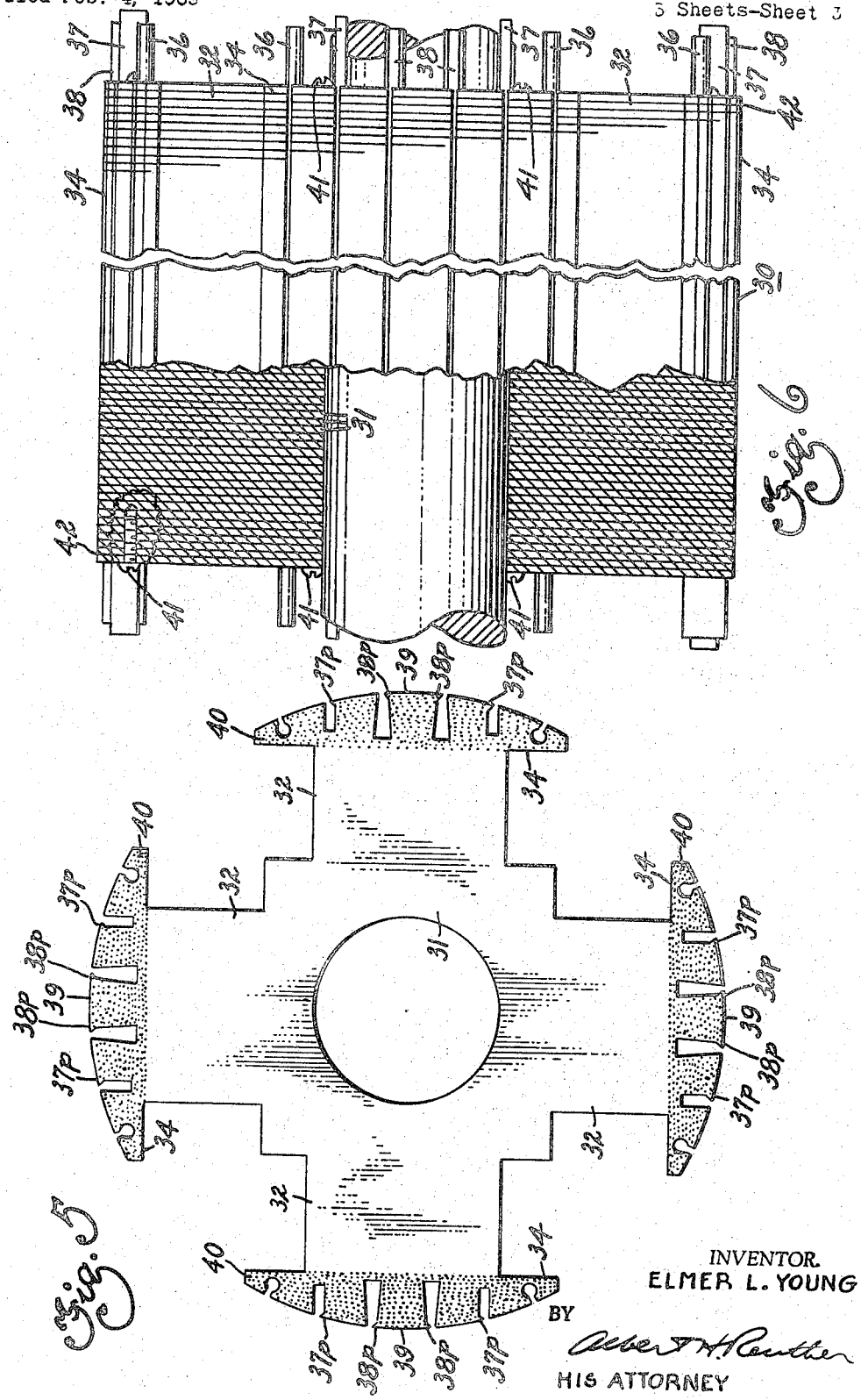
FIGURE 5 is a plan view of a rotor lamination per se with head portions covered by added metal means for use in the structure of FIGURE 4.
FIGURE 6 is a partially sectioned elevational view of the rotor means structure of FIGURE 4 without coil portions of clarity.

In accordance with the present invention at least a pair of adjacent end laminations of which one is illustrated in FIGURE 5 is provided with a plating or coating 40 substantially throughout the areas of the head portion 34. The conductor bars 36, 37 and 38 are fitted into the appropriate slot configurations with the conductor bars 37 and 38 being retained by projections 37p and 38p best seen in the view of FIGURE 5. These projections 37p and 38p aid in retaining the conductor bars against centrifugal forces and heating of the solder or fusible material of the plating or coating 40 results in a juncture of end laminations represented by a reference numeral 42 in FIGURE 6 of the drawings. Also in FIGURE 6, the rotor conductors or bars are shown longitudinally in a partially sectioned view of parts corresponding to those previously identified by reference numerals 36, 37 and 38 respectively. The rounded periphery 39 previously noted can be best seen in FIGURE 5 and the laminations when heated have the head portions thereof fused into a juncture without need of external fittings and hardware to interconnect the bars or conductor of the amortisseur windings together. If necessary, connections pole to pole of the coil winding portions fitted to the reduced thickness portions of the laminations can be made near the shaft away from the space needed for the amortisseur windings or coil winding portions. The shorting of the laminations at the ends does not result in any increase appreciably in stray losses because the amortisseur windings are used mainly for starting purposes and the wound poles are still provided with sufficient magnetic material in the lamination stackup for proper operation. It is to be understood that copper-plated steel laminations are built up punched in accordance with the configuration of the head portion of the laminations and these copper-plated laminations are soldered or brazed together by external soldering or by thin sheets of solder interleaved. In FIGURE 6 of the drawings suitable fastening means such as a screw means 41 can be provided to fit into holes drilled into the ends for drive pins or cap screws to take off all stress of solder along the outer peripheries of the end laminations. The soldered or fused interconnection of the end laminations relative to the conductor bars 36, 37, 38 provides shorting of the poles automatically since the laminations have all the poles in one piece. The present invention thus permits use of rotor means having amortisseur winding connections with considerably fewer parts and less tooling than presently known as well as inexpensive furnace heating for brazing or soldering purposes if desired Suitable higher temperature solders can be used than where the interconnections are attempted to be made after the poles are wound. If necessary, connections from pole to pole can be made near the shaft away from space needed for windings. Use of the juncture of fusion or solder coated laminations adjacent to ends for the amortisseur winding portions can result in considerable savings of materials and also problems of balancing previously encountered for such windings which also had to be adapted for variation in temperatures.

While the embodiments of the present invention as herein disclosed constitute preferred forms, it is to be understood that other forms might be adopted.

What is claimed is as follows:

1. A dynamoelectric machine rotor means, comprising, an axially extending shaft portion, plural rotor laminations of magnetic material carried on said shaft portion and having substantially longitudinally extending passages located radially inwardly from outer periphery of said laminations, rotor conductor means carried in said passages of said laminations, and regions of solder that effectively join at least pairs of said laminations at both ends in locations axially separated by remaining laminations, said regions of solder also having short circuit contact for at least said pairs of laminations collectively at each end directly to said rotor conductor means.

2. The rotor means of claim 1 wherein said conductor means extend longitudinally beyond said end laminations as fully exposed simulated-fan-blade heat dissipator means completely free of any end ring short circuiting externally of said laminations which accomplish dual purpose with said magnetic material thereof both to retain magnetic characteristics and having said solder regions therewith in electrical juncture directly with said rotor conductor means.

3. The rotor means of claim 1 wherein said end laminations at each end collectively have a slight taper radially inwardly from outer diameter particularly in said solder regions thereof.

4. The rotor means of claim 1 wherein said laminations define at least two radially located pole portions each having said conductor means limited into confines thereof as amortisseur windings in short circuit only due to said end laminations and solder regions, and winding coils fitted around each of said pole portions.

5. An amortisseur winding arrangement, comprising, in combination, plural rotor laminations on a common mounting shaft and collectively defining predetermined pole portions each with a reduced thickness in intermediate location as well as enlarged slotted though arcuate outer head ends, wound coil means secured in each reduced thickness location of said pole portions of said laminations, additional rotor conductor means carried in said slotted though arcuate outer head ends, and regions of solder that effectively join at least pairs of said laminations at both ends in locations axially separated by remaining laminations, said regions of solder being electrically complementary to both said conductor means and end laminations collectively as amortisseur winding for less increase in stray losses due to elimination of external amortisseur connection.

6. A rotor winding arrangement, comprising, plural rotor laminations on a common mounting shaft and collectively defining slotted outer peripheral portions, rotor conductor means carried at least in said slotted outer peripheral portions, and regions of a fusible lamination coating of electrically conductive material in at least predetermined locations for juncture directly with said conductor means tantamount to combination end ring and end lamination means, said regions of coating having purpose for material savings due to fusion thereof into electrical shorting connection directly to opposite ends of said conductor means.

7. A rotor means, comprising a shaft portion carrying plural laminations of identically punched and peripherally slotted magnetic material per se, electrical conductors carried by said laminations where slotted, an insulating lamination of high temperature phenolic material adjacent to each of axial ends, and combination end ring and end lamination means of only end laminations conductively solder coated for material savings due to fusion thereof into electrical shorting connection directly to opposite ends of electrical conductors extending axially through all of said laminations as well as said insulating lamination at each end.

References Cited
UNITED STATES PATENTS 2,411,002  11/1946  Rüdenberg _____ 172—120

MILTON O. HIRSHFIELD, *Primary Examiner.*

R. W. TEMPLETON, *Assistant Examiner.*